US011663201B2

United States Patent
Alakuijala et al.

(10) Patent No.: US 11,663,201 B2
(45) Date of Patent: May 30, 2023

(54) GENERATING QUERY VARIANTS USING A TRAINED GENERATIVE MODEL

(71) Applicant: Google LLC, Mountain View, CA (US)

(72) Inventors: Jyrki Alakuijala, Wollerau (CH);
Christian Buck, Kilchberg (CH);
Jannis Bulian, Zurich (CH);
Massimiliano Ciaramita, Zurich (CH);
Wojciech Gajewski, Freienbach (CH);
Andrea Gesmundo, Zurich (CH); Neil Houlsby, Zurich (CH); Wei Wang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 718 days.

(21) Appl. No.: 16/609,318

(22) PCT Filed: Apr. 27, 2018

(86) PCT No.: PCT/US2018/029834
§ 371 (c)(1),
(2) Date: Oct. 29, 2019

(87) PCT Pub. No.: WO2018/200979
PCT Pub. Date: Nov. 1, 2018

(65) Prior Publication Data
US 2020/0142888 A1    May 7, 2020

Related U.S. Application Data

(60) Provisional application No. 62/492,154, filed on Apr. 29, 2017.

(51) Int. Cl.
*G06F 16/242* (2019.01)
*G06N 3/08* (2023.01)
(Continued)

(52) U.S. Cl.
CPC .......... *G06F 16/242* (2019.01); *G06N 3/047* (2023.01); *G06N 3/08* (2013.01); *G06N 3/044* (2023.01)

(58) Field of Classification Search
CPC . G06F 16/242; G06F 16/3338; G06N 3/0472; G06N 3/08; G06N 3/0445
(Continued)

(56) References Cited

U.S. PATENT DOCUMENTS 8,326,861 B1 * 12/2012 Ainslie ................. G06F 16/335
                                                         707/766
8,583,675 B1 * 11/2013 Haahr ............... G06F 16/90324
                                                         707/723
(Continued)

FOREIGN PATENT DOCUMENTS

CN        1758248 A  *  4/2006  ......... G06F 16/9535
CN        102521335           6/2012
(Continued)

OTHER PUBLICATIONS

Jones et al., "Generating Query Substitutions", Proceedings of the 15th International Conference on World Wide Web, May 2006, pp. 387-396. (Year: 2006).*

(Continued)

*Primary Examiner* — Phuong Thao Cao
(74) *Attorney, Agent, or Firm* — Gray Ice Higdon

(57) ABSTRACT

Systems, methods, and computer readable media related to generating query variants for a submitted query. In many implementations, the query variants are generated utilizing a generative model. A generative model is productive, in that it can be utilized to actively generate a variant of a query based on application of tokens of the query to the generative model, and optionally based on application of additional input features to the generative model.

23 Claims, 8 Drawing Sheets

(51) Int. Cl.
*G06N 3/047* (2023.01)
*G06N 3/044* (2023.01)

(58) Field of Classification Search
USPC .......................................................... 706/12
See application file for complete search history.

(56) References Cited

U.S. PATENT DOCUMENTS

| | | | | |
|---|---|---|---|---|
| 8,626,681 | B1* | 1/2014 | Jurca | G06F 40/232 |
| | | | | 706/12 |
| 8,762,374 | B1* | 6/2014 | Chen | G06F 16/9535 |
| | | | | 707/733 |
| 9,110,975 | B1* | 8/2015 | Diligenti | G06F 16/3325 |
| 9,141,916 | B1* | 9/2015 | Corrado | G06F 7/483 |
| 9,697,249 | B1* | 7/2017 | Bailey | G06F 16/24578 |
| 10,055,500 | B2* | 8/2018 | Bolshinsky | G06F 16/24542 |
| 10,769,547 | B2* | 9/2020 | Yi | G06F 16/9538 |
| 2007/0011154 | A1 | 1/2007 | Musgrove | |
| 2008/0005069 | A1 | 1/2008 | Payne | |
| 2008/0140699 | A1* | 6/2008 | Jones | G06F 16/3325 |
| | | | | 707/999.102 |
| 2009/0187515 | A1 | 7/2009 | Andrew et al. | |
| 2010/0023495 | A1 | 1/2010 | Gupta | |
| 2012/0131031 | A1* | 5/2012 | Xie | G06F 16/9032 |
| | | | | 707/765 |
| 2012/0191745 | A1* | 7/2012 | Velipasaoglu | G06F 16/3322 |
| | | | | 707/E17.074 |
| 2012/0233140 | A1* | 9/2012 | Collins-Thompson | |
| | | | | G06F 16/3338 |
| | | | | 707/706 |
| 2012/0269116 | A1* | 10/2012 | Xing | G06F 16/3322 |
| | | | | 707/706 |
| 2013/0226935 | A1* | 8/2013 | Bai | G06N 20/00 |
| | | | | 707/E17.014 |
| 2013/0238587 | A1* | 9/2013 | Annau | G06F 16/3335 |
| | | | | 707/708 |
| 2013/0346400 | A1* | 12/2013 | Ramsey | G06F 16/951 |
| | | | | 707/E17.084 |
| 2014/0280107 | A1 | 9/2014 | Heymans et al. | |
| 2015/0032443 | A1* | 1/2015 | Karov | G06F 40/30 |
| | | | | 704/9 |
| 2015/0293976 | A1* | 10/2015 | Guo | G06F 16/9535 |
| | | | | 707/706 |
| 2015/0317317 | A1* | 11/2015 | Deng | G06F 16/24578 |
| | | | | 707/748 |
| 2016/0188726 | A1* | 6/2016 | Shang | G06F 16/9032 |
| | | | | 707/706 |
| 2016/0239576 | A1* | 8/2016 | Annau | G06F 16/9535 |
| 2017/0098012 | A1* | 4/2017 | Zhu | G06F 16/9535 |
| 2017/0178048 | A1* | 6/2017 | Ghotbi | G06N 3/006 |
| 2017/0193057 | A1* | 7/2017 | Yi | G06F 16/335 |
| 2019/0278812 | A1 | 9/2019 | Otsuka et al. | |

FOREIGN PATENT DOCUMENTS

| | | |
|---|---|---|
| CN | 106471497 | 3/2017 |
| KR | 20080072673 | 8/2008 |
| KR | 20170043582 | 4/2017 |
| WO | WO-2007005431 A1 * 1/2007 | ....... G06F 16/24578 |
| WO | 2018097091 | 10/2019 |

OTHER PUBLICATIONS

Korean Patent Office; Office Action issue in Application No. 1020197035500; 14 pages; dated Jan. 28, 2021.

Japanese Patent Office; Notice of Allowance issue in Application No. 2019-558737; 3 pages; dated May 24, 2021.

Intellectual Property India; Office Action issued in Application No. 201927044115; 8 pages; dated Apr. 12, 2021.

European Patent Office; Summons to attend oral proceedings pursuant to Rule 115(1) EPC issued in Application No. 18724709.3; 14 pages; dated Oct. 15, 2021.

Magioladitis et al., "Collaborative Filtering," Wikipedia—the free encyclopedia, retrieved from internet URL:https://en.wikipedia.org/w/index.php?title=Collaborative_filtering&oldid=775211543 [retireved on Jul. 4, 2018], 11 pages 2017.

Isingness et al., "Deep Learning," Wikipedia—the free encyclopedia, Apr. 21, 2017, retrieved from the internet: URL: https://en.wikipedia.org/w/index.php?title=Deep_learning&oldid=776543240#Deep_neural_network_architectures [retrieved on Jul. 4, 2018]; 46 pages 2017.

Written Opinion and International Search Report for Application PCT/US2018/029834, dated Jul. 16, 2018.

Ciaramita, M. et al. "Using Machine Translation Query Rewrite Generation"; Technical Disclosure Commons; http://www.tdcommons.org/dpubs_series/92; 9 pages; Jan. 6, 2016.

Nogueira, R. et al. "Task-Oriented Query Reformulation with Reinforcement Learning"; Cornell University; arXiv.org; arXiv:1704.04572v1; 9 pages; Apr. 15, 2017.

Otsuka, Atsushi et al., Proposal of document retrieval method to look ahead to answers, 9th Forum on Data Engineering and Information Management; pp. 108; URL: http://dbevent.jpn.org/deim2017/papers/328.pdf; dated Mar. 31, 2017.

Sordoni, Alessandro et al., A Hierarchical Recurrent Encoder-Decoder for Generative Context-Aware Query Suggestion; pp. 1-10; dated Jul. 8, 2015.

Japanese Patent Office; Notice of Office Action issue in Application No. 2019-558737; 15 pages; dated Dec. 14, 2020.

European Patent Office; Communication Pursuant to Article 94(3) EPC issue in Application No. 18724709.3; 12 pages; dated Oct. 28, 2020.

Korean Patent Office; Notice of Allowance issue in Application No. 1020197035500; 4 pages; dated Jul. 16, 2021.

NIPPON Telegraph and Telephone Corporation; DEIM Forum; https://db-event.jpn.org/deim2017/papers/328.pdf; dated Mar. 31, 2017.

European Patent Office; Preliminary Opinion issued in Application No. 18724709.3, 19 pages, dated Sep. 30, 2022.

China National Intellectual Property Administration; Notification of First Office Action issued in Application No. 201880028212.7; 29 pages; dated Dec. 1, 2022.

Otsuka, A. et al.; A Proposal of a Document Retrieval Method for Prefetching Answers; 19 pages; dated Mar. 31, 2017.

* cited by examiner

GENERATING QUERY VARIANTS USING A TRAINED GENERATIVE MODEL

BACKGROUND

Rules-based rewrites of search queries have been utilized in query processing components of search systems. For example, some rules-based rewrites may generate a rewrite of a query by removing certain stop words from the query, such as "the", "a", etc. The rewritten query may then be submitted to the search system and search results returned that are responsive to the rewritten query.

Further, collections of similar queries have been utilized in search systems to, for example, recommend additional queries that are related to a submitted query (e.g., "people also search for X"). Similar queries to a given query are often determined by navigational clustering. For example, for the query "funny cat pictures", a similar query of "funny cat pictures with captions" may be determined based on that similar query being frequently submitted by users following submission of "funny cat pictures". Similar queries for a given query are thus often predefined.

SUMMARY

Implementations of this specification are directed to systems, methods, and computer readable media related to generating query variants for a submitted query. In many implementations, the query variants are generated at run time utilizing a trained generative model. A generative model is productive, in that it can be utilized to actively generate a variant of a query based on application of tokens of the query to the generative model, and optionally based on application of additional input features to the generative model. In this manner, a generative model can be utilized to generate variant(s) of any query, even if the generative model was not trained based on the query. Accordingly, the generative model can be utilized to generate variants for novel queries and for so-called "tail" queries (i.e., those with a submission frequency and/or submission quantity below a threshold). As a result, queries can be processed more effectively as the richer query input can lead to more efficient identification of relevant results. For example, queries are not excluded simply due to low submission frequency and/or submission quantity. The improved efficiency can lie in the speed with which relevant results can be obtained, as it is not necessary to require a user to re-submit a modified query in the event that an initial query does not generate any relevant results. The disclosed implementations enable a plurality of query variants to be tested automatically. Convergence of results can also be ensured via the training of the model used to generate the variants, such that improved efficiency is achieved not simply through simultaneous processing of multiple queries, but through targeted query variant generation. Use of technical resources required to process a query, including processing power and power consumption of processors implementing the disclosed methods, is thus optimized through implementations of the present invention.

In some implementations, the generative model is a neural network model, such as a neural network model with one or more "memory layers". A memory layer includes one or more recurrent neural network (RNN) units, such as a long short-term memory ("LSTM") unit and/or a gated recurrent unit ("GRU").

In some implementations where the generative model is a neural network model with memory layers, the generative model is a sequence to sequence model. For example, the sequence to sequence model can be one where tokens of a query can be applied as input to the model (e.g., on a token-by-token basis or combined basis), and an encoding of the tokens generated over layers of the network. Further, the generated encoding can be decoded over additional layers of the network, where the resulting decoding indicates (directly or indirectly) a variant of the query. For instance, the resulting decoding can be applied to softmax layer(s) of the network to generate the variant of the query. In some versions of those implementations, the generative model has the same or similar architecture as a sequence to sequence neural machine translation model and is trained utilizing query variant specific training data. The query variant specific training data can be, for example, based on: query pairs that each have "clicks" on the same documents (e.g., to train for equivalent query variant generation); query pairs submitted in succession (e.g., to train for follow-up query variant generation); and/or original, canonical query pairs (e.g., to train for canonicalization query variant generation). Such a model can be optionally pre-trained based on translation training data.

In some implementations, the generative model is trained as a "multitask" model, in that it is trained to enable generation of any one of multiple types of query variants. In some of those implementations, the type of query variant to be generated for a given pass of the generative model can be indicated based on a type value input applied to the model in the given pass, where the type value input indicates the type of query variant to be generated. Types of query variants can include, for example, an equivalent query, a follow-up query, a generalization query, a canonicalization query, a language translation query, an entailment query, a specification query, and/or a clarification query (i.e., a query that is provided as output to the user to prompt for clarification). Additional and/or alternative types may be defined, including those of greater or lesser granularity. In training of the generative model, training data from the various types can be utilized, where each instance of training data includes a type value input that indicates the type of query variant for that instance, and that can be utilized as training instance input during training. In some of these implementations, training a multitask model in such a manner can exploit information sharing across the various types of training data, which may lead to more robust performance of the trained multitask model.

Once trained, the multitask model can be utilized to generate, for a query in a first pass, a variant of a first type (e.g., based on applying a first type value as input) and to generate, for a query in a second pass, a variant of a second type (e.g., based on applying a second type value as input). Additional variants of additional types may be generated in additional passes. As described herein, the quantity of additional passes generated utilizing a multitask model can vary from query to query. For example, the quantity of additional passes can be controlled in an ad-hoc manner based on, for example, variant(s) generated in pass(es) and/or response(s) to such variant(s). Further, a subsequent pass may generate a variant that is of the same type as a prior variant generated in a prior pass. In some of those situations, as described herein, the subsequent pass may utilize information based on the prior variant (e.g., the prior variant itself and/or response(s) for the prior variant) and/or other prior variants, which can lead to the variant of the subsequent pass being different from the prior variant.

In some implementations, multiple variants of an original query are generated utilizing the generative model, each of the multiple variants are submitted to a search system, and corresponding response(s) received for each of the multiple variants. An output can be generated based on one or more of the responses, and the output provided in response to the original query. For example, the output can include the "best" response (e.g., as indicated by response scores provided by the search system), multiple of the "best" responses, and/or a variant and corresponding response(s) (e.g., when the variant is of a follow-up type). In this and other manners, response(s) to variant(s) of an original query can be utilized to provide output, in response to the original query, where the output directly answers the original query. Further, response(s) to variant(s) of an original query can be utilized to substantiate/corroborate response(s) to the original query and/or response(s) to other variant(s). For example, the accuracy of an "answer" to an original query can be determined based on whether affirmative answers are provided for variants of the original query. For instance, based on whether other affirmative answers are provided for variant(s) of a follow-up type and/or based on whether affirmative similar answers (similar to the answer of the original query) are available to variant(s) of equivalent, generalization, and/or language translation type(s). In this and other manners, unsubstantiated/uncorroborated response(s) can be determined and not utilized in provided output, and/or flagged as uncorroborated if utilized in provided output (e.g., flagged as "potentially fake").

In some implementations and/or situations, multiple responses are returned by the search system as responsive to a variant. In some other implementations and/or situations, the search system provides a single response as responsive to the variant. In some of those implementations, the single response includes either an "answer" (e.g., a response the search system has deemed is an answer to the variant), or an indication that no answer is known. In other implementations, the indication that no answer is known may be a lack of any response by the search system. The search system may be a search system that operates across multiple domains, or that is particularized to one or more particular domains (e.g., an on-line shopping domain). A response returned by a search system can be, for example, a search result (e.g., a snippet of content from a document and a link to the document), an answer (e.g., content deemed by the search system as an authoritative answer), an image, a video, or a knowledge graph entity, a "null" response (e.g., a "no answer" response). In some situations, a generated variant may additionally or alternatively be provided as output to the user (that submitted the original query) to prompt for clarification, and clarifying user interface input provided by the user in response to the prompt can be utilized as a "response" to the variant. Such user provided response can be utilized to influence further variant generation. For example, such user provided response can be utilized to generate a context vector that is passed to the generative model in a further iteration of generating a variant.

In some implementations, multiple generative models can be generated, with each of the generative models being trained based on training data that is based on past query submissions of a unique group of users. For example, a first generative model can be generated based on training data that is based on past query submissions of users having attributes A and B. A second generative model can be generated based on training data that is based on past query submissions of users having attributes B and C. For a submitted query of a user having attributes B and C (but not A), the second generative model can be selected for use (without also selecting the first generative model) in generating variants for that user—as the user attributes B and C match those utilized in training the second generative model. In this manner, a generative model can be selected, from a plurality of available generative models, such that the selected generative model is tailored to attributes of the user. This may result in generation of query variants, utilizing the selected generative model, that are more appropriate for the user. For example, very different variants can be generated for a scientific researcher as compared to, for example, a freelance writer.

In some implementations, multiple generative models can be generated, with each of the generative models being trained based on training data that is based on past query submissions associated with particular attributes, such as particular attributes of a user, particular temporal attributes, and/or other attributes. For example, the first generative model can be generated based on training data that is based on past query submissions associated with an on-line shopping task. For instance, the past query submissions can be identified based on being submitted to an on-line shopping search system, based on users selecting shopping content (e.g., certain ads) in association with the submissions, based on search results being shopping centric, based on users completing a transaction following the submissions, etc. A second generative model can be generated based on training data that is based on past query submissions associated with different particular attributes. For example, the second generative model can be generated based on training data that is based on past query submissions associated with a traveling to a location task (e.g., to any location, any restaurant location, a meeting location, etc.). For instance, the past query submissions can be identified based on being submitted before and/or during travel to a location, based on being submitted temporally close to a scheduled calendar entry, etc. For a submitted query of a user, a task of the user can be predicted, and a generative model corresponding to the predicted task selected for generating variants for that submitted query. For example, if a calendar entry and/or electronic communications of the user indicate the user is travelling to a location (or will soon be travelling to the location), the second generative model in the preceding example can be selected based on that model being associated with a travelling to a location task. In this manner, a generative model can be selected, from a plurality of available generative models, such that the selected generative model is tailored to a task of the user, such as a predicted task being engaged in, or to be engaged in. This may result in generation of query variants, utilizing the selected generative model, that are more appropriate for the current task of the user. As described above and elsewhere herein, in various implementations a generative model can be a multitask model and enable generation of query variants of various disparate types. Some of those various implementations enable use of the generative model to generate variants that expand a user query and enable exploration of multiple paths of extending the query. Such variants can be provided for presentation to the user (e.g., optionally without first issuing queries based on such variants), simultaneously or sequentially, to enable the user to explore various paths for extending the query. Additionally or alternatively, responses to such variants can be obtained from a search system, and the responses provided for presentation to the user to enable the user to explore the various responses for the extensions to the query.

Some implementations described herein can be utilized to generate variants of queries that are submitted by users that may have difficulties in formulating queries (e.g., due to a physical impairment). For example, a query can be formulated by a user utilizing gaze-guided (or other low-effort) user interface input, and query variants generated according to techniques described herein. In this manner, query variants of a query can be generated and presented to a user without requiring the user to manually generate such variants.

As described herein, the generative model can be utilized to actively generate a variant of a query based on application of tokens of the query to the generative model, and optionally based on application of additional input features to the generative model. In some of those implementations, the additional input features can include attributes associated with a user that submitted the query, temporal attributes, and/or other features. Attributes associated with a user can include, for example, a location of the user (e.g., Louisville, Ky.; in a "restaurant"; Southeast US), a task associated with the user (e.g., cooking, repairing a car, planning for travel), and/or weather at the location of the user. A task associated with the user can be a task currently engaged in by the user, or to be engaged in by the user. In some implementations, the task is predicted based on various signals such as, for example, stored calendar entries of the user, electronic communications of the user (e.g., chat messages or other communications sent to or by the user), past queries submitted by the user, etc. Temporal attributes can include, for example, a current time, a current day of the week, and/or a current date. In this manner, query variant generation utilizing the generative model can be personalized to a user and/or a current context based on application of additional input features to the generative model.

In some implementations, a generative model may be utilized to generate variants of a query, and advertisements or other content provided to a client device that generated the query, based on such content being assigned to one or more of the variants. In some of those implementations, the variants generated by the generative model may be tailored to the client device and/or the user of the client device utilizing techniques such as those described herein. For example, the generative model may be selected based on attribute(s) of the user and/or attributes associated with a user can be provided as input to the generative model and utilized in generating the variants.

In some implementations, the generative model is utilized to generate a variant of an original query (and/or a token of a variant) at each of multiple time steps. In some of those implementations, at a given time step, whether a variant is generated and/or which variant is generated can be based on current state feature(s). The current state feature(s) can include, for example, features based on: search system response(s) to the original query; search system response(s) to variant(s) of the original query generated at prior time step(s); variant(s) of the original query generated at prior time step(s); user response(s) to variant(s) of the original query (e.g., a clarification variant provided as a prompt to the user); and/or the original query. In this manner, variant generation for a query during a session can be dynamically influenced based on previously generated variant(s) of the query during the session, response(s) to the previously generated variant(s), and/or the original query. For example, in some implementations one or more of such current state features can be utilized to determine whether a further variant should be generated or, in the alternative, whether response(s) to prior variant(s) (and/or to the original query) should instead be provided in response to the original query without generation of a further variant. Also, for example, in some additional or alternative implementations, one or more of such current state features can be applied (directly or indirectly) as input to the generative model to influence the variant generation at the time step. For instance, a vector summary of the current state features can be generated and applied as input to the generative model to influence the variant generated.

In some implementations, a trained control model is utilized to determine, at each of a plurality of time steps, whether a variant is to be generated and/or feature(s) that will be provided as input to the generative model to influence the variant generation at the time step. For example, the trained control model can be a feedforward neural network model or a recurrent neural network (RNN) model. Current state features can be applied as input to the trained control model to generate, over the model, value(s) that indicate whether a further variant is to be generated and/or feature(s) (e.g., a vector summary of current state features and/or a reward signal) to be provided to the generative model to influence variant generation (if a further variant is to be generated). In this manner, the control model can act as a "critic" and the generative model can act as an "actor" in an actor-critic environment. The trained control model can thus be utilized to determine whether further variants are to be generated and/or feature(s) for influencing such generation, based on observed current state feature(s). In this manner, the trained control model can control the quantity of additional variants that are generated for a given query. Such control can cause the quantity of variants generated to vary from query to query, as the control model dynamically determines a quantity of iterations of variant generation for a given query based on, for example, variant(s) generated in prior iterations for the given query and/or response(s) to such variant(s). It is understood that such dynamic control can often lead to a relatively large (e.g., more than 5, more than 10, or more than 15) quantity of variants being generated and/or a relatively large quantity of responses to such variants being considered.

In some implementations, the control model and/or the generative model can be trained at least in part based on reinforcement learning. In some of those implementations, the control model and the generative model are trained separately, but in combination with one another. In training the control model and/or the generative model based on reinforcement learning, generated variants may be submitted to a search system, and responses (and optionally lack of responses) from the search system can indicate rewards. For example, for a response, to a query variant, that is an "answer" response, a reward can be assigned that is proportional (or otherwise related) to a quality of the answer response (e.g., as indicated by a response score, provided by the search system, for the "answer" response). In some of those examples, where no response is provided in response to a query variant and/or when the response is deemed (e.g., based on output from the search system) to not be an "answer" response, no reward will be assigned. In other words, only the last "answer" response will be rewarded and intermediate actions updated based on such reward (e.g., with a Monte-Carlo Q learning approach). In this manner, Q function learning, or other reinforcement function learning, can occur based on rewards that are conditioned on responses provided by a search system that is interacted with during the reinforcement learning. In implementations of reinforcement learning described herein, the state at a given time step is indicated by one or more of the state features (e.g., such as those described above), and the action can be either a query variant (i.e., generate a further query variant) or provide an "answer" response. Each action of the action space can be paired with a string that defines the corresponding question or "answer" response.

In some implementations, a method implemented by one or more processors is provided that includes receiving an original query that is generated based on user interface input of a user via a client device. The method further includes applying, as input to a trained generative model: tokens of the original query, and one or more attributes associated with the user. The trained generative model is a sequence to sequence deep neural network model with one or more memory layers. The method further includes generating at least one variant of the original query based on application of the tokens and the one or more attributes to the trained generative model. The method further includes generating an output based on at least one of: the at least one variant, and at least one search system response to the at least one variant. The method further includes providing, in response to the original query, the output for presentation via the client device.

In some implementations, a method implemented by one or more processors is provided that includes receiving an original query; applying tokens of the original query as input to a trained generative model; and generating multiple variants of the original query based on application of tokens of the original query to the trained generative model. The original query can be generated based on user interface input of a user via a client device. Each of the generated variants differs from the original query and generating the variants includes producing the variants based on learned parameters of the trained generative model. The trained generative model is trained to enable generation of multiple types of query variants, and the generated variants include a first variant that is a first type of the multiple types of query variants and a second variant that is a second type of the multiple types of query variants. The method further includes: generating an output based on at least one of the multiple variants and/or at least one search system response to at least one of the multiple variants; and providing, in response to the original query, the output for presentation via the client device.

In some implementations, a method implemented by one or more processors is provided that includes receiving an original query that is generated based on user interface input of a user via a client device. The method further includes selecting a trained generative model, from a plurality of trained generative models, based on the trained generative model being trained based on past query submissions of a group of users having one or more attributes in common with the user. The method further includes: applying tokens of the original query as input to the selected trained generative model; generating at least one variant of the original query based on application of tokens of the original query to the trained generative model; and generating an output based on the at least one variant and/or at least one search system response to the at least one variant. The method further includes providing, in response to the original query, the output for presentation via the client device.

In some implementations, a method implemented by one or more processors is provided that includes receiving an original query, applying tokens of the original query as input to a trained generative model, and generating a variant of the original query over the trained generative model based on the input. The original query can be generated based on user interface input of a user via a client device. The variant generated over the trained generative model differs from the original query and generating the variant of the query includes producing the variant based on learned parameters of the trained generative model. The method further includes: determining a variant response for the variant of the query based on submission of the variant of the query to a search system; applying additional input to the trained generative model; and generating an additional variant of the original query over the trained generative model based on the additional input. The additional input applied to the trained generative model includes at least one of: the tokens of the original query, and variant tokens of the variant of the original query. The generated additional variant varies from the variant and the original query, and generating the additional variant of the original query comprises producing the additional variant based on the learned parameters of the trained generative model. The method further includes determining an additional variant response for the additional variant of the original query based on submission of the additional variant of the original query to the search system. The method further includes: generating an output based the variant response and/or the additional variant response; and providing, in response to the original query, the output for presentation via the client device.

In some implementations, a method implemented by one or more processors is provided that includes receiving an original query generated based on user interface input of a user via a client device. The method further includes determining a predicted task for the user and applying, as input to a trained generative model: tokens of the original query, and one or more task attributes of the predicted task for the user. The method further includes generating at least one variant of the original query based on application of the tokens and the one or more task attributes to the trained generative model. The method further includes: generating an output based on the at least one variant and/or at least one search system response to the at least one variant; and providing, in response to the original query, the output for presentation via the client device.

In some implementations, a method implemented by one or more processors is provided that includes receiving an original query generated based on user interface input of a user via a client device. The method further includes determining a predicted task for the user. The method further includes selecting a trained generative model, from a plurality of trained generative models, based on the trained generative model being trained based on past query submissions associated with the predicted task. The method further includes: applying tokens of the original query as input to the selected trained generative model; generating at least one variant of the original query based on application of tokens of the original query to the trained generative model; and generating an output based on the at least one variant and/or at least one search system response to the at least one variant. The method further comprises providing the output in response to the original query.

Various implementations disclosed herein may include one or more non-transitory computer readable storage media storing instructions executable by a processor (e.g., a central processing unit (CPU), graphics processing unit (GPU), and/or Tensor Processing Unit (TPU)) to perform a method such as one or more of the methods described herein. Yet other various implementations may include a system of one or more computers that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION OF THE DRAWINGS

Figure 1:
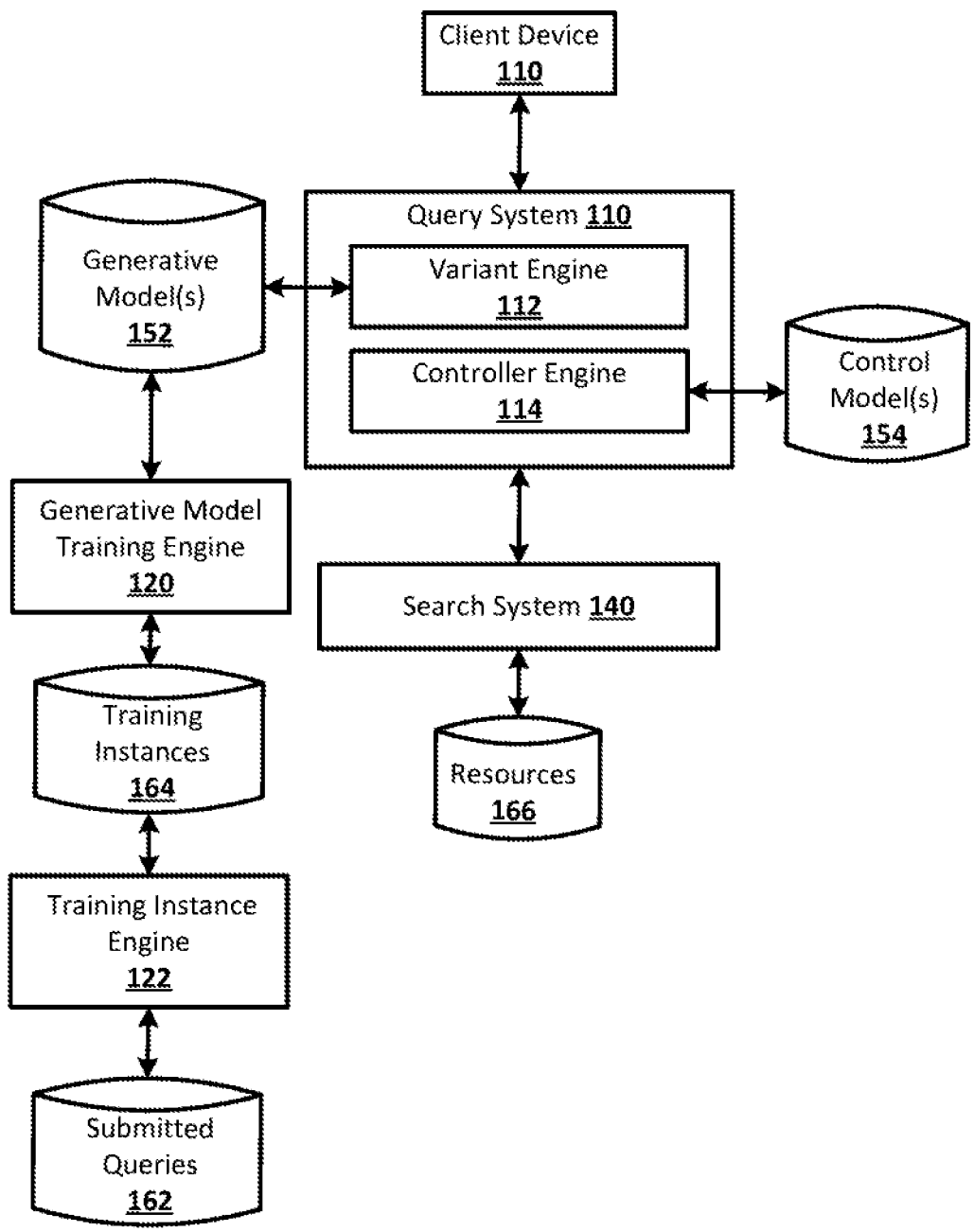
FIG. 1 is a block diagram of an example environment in which implementations disclosed herein may be implemented.

FIG. 1 illustrates an example environment in which implementations disclosed herein may be implemented. The example environment of FIG. 1 includes a client device 106, a query system 110, a search system 140, a generative model training engine 120, and a training instance engine 122. Such systems and engines may each be implemented in one or more computing devices that communicate, for example, through a communication network. A communication network may include a wide area network (WAN) such as the Internet, one or more intranets, and/or one or more bus subsystems. A communication network may optionally utilize one or more standard communications technologies, protocols, and/or inter-process communication techniques.

Query system 110, search system 140, generative model training engine 120, and training instance engine 122 are example components in which techniques described herein may be implemented and/or with which systems, components, and techniques described herein may interface. The operations performed by one or more of the systems 110, 140 and engines 120, 122 of FIG. 1 may each be distributed across multiple computer systems. In some implementations, one or more aspects of the systems 110, 140 and engines 120, 122 may be combined in a single system and/or one or more aspects may be implemented on the client device 106. For example, in some of those implementations aspects of query system 110 may be combined with aspects of search system 140.

A user of client device 106 can formulate a query via client device 106 by providing user interface input via one or more user interface input devices of the client device 106. The client device 106 submits the query to the query system 110. In some situations, the query is in a textual form. In other situations, the query can be submitted in an audio and/or other form, and converted by the query system 110 (or other component) to a textual form.

For a received query, the query system 110 generates one or more variants of the received query and causes output to be provided, to client device 106, where the output is based on one or more of the variants. In some implementations, the output includes one or more of the variants to be provided as suggested alternative variants for consideration by the user. In some implementations, the output additionally or alternatively includes content that is based on one or more responses, from search system 140, where the response(s) are based on submission of one or more of the variants to the search system 140. The search system 140 can determine responses based on access of one or more resources 166 and can utilize various techniques, such as traditional information retrieval techniques. The content that is based on a response can be, for example, graphical and/or audible "answers" or other search result that is based on (e.g., the same as) the response. Where content that is based on response(s) is provided, the query system 110 can provide the content to the client device 106 directly, or can cause the search system 140 to provide the content to the client device 106. In some implementations, the query system 110 and the search system 140 may optionally be controlled by the same party and/or work in concert with one another. Additional and/or alternative output can be provided based on generated variants, such as an advertisement that is assigned to a generated variant in one or more databases.

In FIG. 1, query system 110 includes a variant engine 112 and a controller engine 114. In some implementations, one or more aspects of variant engine 112 and controller engine 114 may be combined and/or implemented in a component that is separate from query system 110, such as client device 106. In some implementations, controller engine 114 may be omitted.

Variant engine 112 utilizes one or more trained generative models 152 to generate one or more query variants for a submitted query. In some implementations, the variant engine 112 includes one or more CPUs, GPUs, and/or TPUs that operate over the trained generative models 152. The variant engine 112 generates a variant for a submitted query by applying tokens of the query as input to one of the generative models 152, and generating the variant over the generative model based on the input. In many implementations, in generating the variant, the variant engine 112 further applies additional input features as input to the generative model and generates the variant based on the additional input features.

In some implementations, the additional input features can include attributes associated with a user that submitted the query, temporal attributes, and/or other features. For example, in generating a variant for an original query, the variant engine 112 can apply, as input to one of the generative models 152, tokens of the original query, attributes of a user that submitted the query (e.g., a location of the user, a task engaged in by the user), and temporal attributes (e.g., a current day of the week, a current time of day)—and generate the variant over the generative model based on the applied input.

In some implementations, the additional input features applied at a given iteration of generating a variant for an original query can additionally or alternatively include features based on variant(s) of the original query generated at prior iteration(s) and/or based on search system response(s) to such variant(s). For example, in generating a variant for an original query, the variant engine 112 can generate a variant at each of multiple time steps. At a given time step, the variant engine 112 can apply, as input to one of the generative models 152, features based on: search system response(s) to the original query; search system response(s) to variant(s) of the original query generated at prior time step(s); variant(s) of the original query generated at prior time step(s); and/or the original query. In this manner, variant generation of the given time step can be influenced by previously generated variant(s), response(s) to the previously generated variant(s), and/or the original query.

In some implementations, the additional input features applied at a given iteration of generating a variant for an original query can additionally or alternatively include a type value. For example, in some implementations one of the generative models 152 can be a "multitask" model, in that it is trained to enable generation of any one of multiple types of query variants. In some of those implementations, the variant engine 112 can apply, as input to one of the generative models 152, a type value that indicates the type of query variant to be generated. Types of query variants can include, for example, an equivalent query, a follow-up query, a generalization query, a canonicalization query, a language translation query, and/or an entailment query. In some implementations, the variant engine 112 selects a different type value at each of a plurality of iterations of generating a variant to thereby generate multiple variants of disparate types utilizing the same generative model.

In some implementations, multiple generative models 152 are accessible to the variant engine 112 and the variant engine 112 selects a subset of one or more of the multiple generative models 152 for generating variant(s) for a submitted query based on one or more parameters. For example, multiple generative models 152 can be provided, with each of the generative models being trained based on training data that is based on past query submissions of a unique group of users. For example, a first generative model can be generated based on training data that is based on past query submissions of users having attributes A and B. A second generative model can be generated based on training data that is based on past query submissions of users having attributes B and C. For a submitted query of a user having attributes B and C (but not A), the variant engine 112 can select the second generative model (without also selecting the first generative model) in generating variants for that query—as the user attributes B and C match those utilized in training the second generative model.

Also illustrated in FIG. 1 are a generative model training engine 120 and a training instance engine 122. The training instance engine 122 generates training instances and stores the training instances in training instances database 164. For example, the training instance engine 122 can generate a plurality of training instances based on submitted queries database 162, which stores past query submissions of a large population of users. The generative model training engine 120 trains the generative models 152 based on the stored training instances of database 164. As described herein, in some implementations one or more of the generative models 152 may optionally be further trained utilizing reinforcement learning techniques that do not rely upon training instances of training instances database 164. Additional description of implementations of engines 120, 122, and databases 162 and 164 is provided below in description related to FIG. 2.

The controller engine 114, when provided, works in concert with the variant engine 112 and: controls whether variant engine 112 generates a variant; and/or generates and provides parameters to variant engine 112 that influence the variant generation. The controller engine 114 optionally utilizes one or more trained control models 154 in controlling whether variant engine 112 generates a variant and/or in generating parameters that influence the variant generation. In some implementations, the variant engine 112 includes one or more CPUs, GPUs, and/or TPUs that operate over the trained control models 154.

In some implementations, the controller engine 114 determines, for a submitted query, whether any variants are to be generated by the variant engine 112 for the submitted query. For example, the controller engine 114 can make such a determination based on the submitted query itself and/or based on response(s) (if any) from the search system 140 for the submitted query. For instance, the controller engine 114 can determine to generate variants only if an answer response is not returned by the search system 140 or if any returned answer response is of insufficient quality (e.g., has a search system provided score that fails to satisfy a threshold). In some of those implementations, the controller engine 114 applies tokens of the submitted query and/or features of response(s) to the submitted query to one of the control models 154, and generates output over the control models 154 that indicates whether variants are to be generated. In some additional or alternative implementations, the controller engine 114 applies tokens of the submitted query and/or features of response(s) to one of the control models 154, and generates output over the control models 154 that is provided to the variant engine 112 for application as input to a generative model in generating a variant (thereby influencing the variant generation).

As described herein, in some implementations the variant engine 112 generates a variant of a submitted query at each of multiple time steps. In some of those implementations, the controller engine 114 determines when variant generation should cease. In other words, whether the variant engine 112 generates a variant at a given time step can be contingent on authorization from the controller engine 114. Further, the controller engine 114 can provide, for each time step, features that influence the variant generation at the time step. In determining whether variant generation should cease and/or in generating features that influence variant generation, the controller engine 114 can utilize at least one of the one or more control models 154.

As one example, the controller engine 114 can apply, as input to one of the control models 154, features based on: search system response(s) to the original query; search system response(s) to variant(s) of the original query generated by variant engine 112 at prior time step(s); variant(s) of the original query generated by variant engine at prior time step(s); and/or the original query. The controller engine 114 can generate output over the control model based on the applied input, and utilize the output to determine whether to instruct the variant engine 112 to generate a further variant or to instead cease variant generation. When variant generation is ceased, the controller engine 114 can instead provide a previously generated variant and/or a response to a previously generated variant as output in response to the submitted query. In this manner, the controller engine 114 can act as a "critic" and the variant engine 112 can act as an "actor" in an actor-critic environment. Additional description of implementations of controller engine 114, one of the control model(s) 154, and interactions of the controller engine 114 with the variant engine 112 are described below with respect to FIG. 4.

Figure 2:
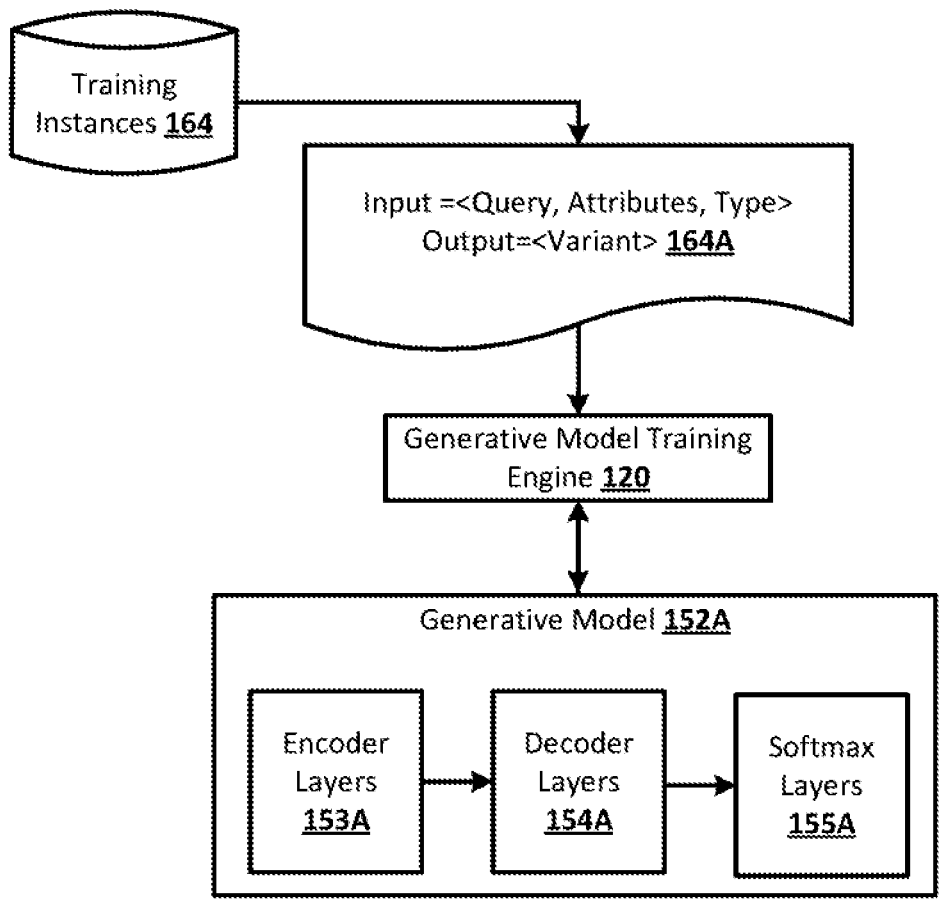
FIG. 2 illustrates an example of training a generative model according to implementations disclosed herein.

Turning to FIG. 2, an example is illustrated of training a generative model 152A of generative models 152. A training instance 164A is retrieved from the training instances database 164. The training instance 164A can be generated by the training instance engine 122 (FIG. 1) based on, for example, a pair of queries previously submitted by a user and stored in submitted queries database 162 (FIG. 1). As one example, the pair of queries can include an earlier in time query of a user of "did roger moore drive an aston martin in the persuaders" and a later in time (e.g., immediately subsequent to the earlier in time query) query of the user of "what car did roger moore drive in the persuaders" (which is of an equivalent type relative to the earlier in time query). As another example, the pair of queries can include an earlier in time query of a user of "did leonardo da vinci paint mona lisa" and a later in time query of the user of "who commissioned leonardo da vinci to paint the mona lisa" (which is of a follow-up type relative to the earlier in time query).

The training instance 164A includes training instance input that includes a query (e.g., the earlier in time submitted query of the pair), attributes, and a type. The attributes can include, for example, an attribute of a user that submitted the query, temporal attributes of the query (e.g., a day of the week of submission), features of search system response(s) to the query, etc. The type can be a type value that indicates what type of variant is included in the training instance output. In some implementations, the type can be assigned by human labeling or can be inferred by the training instance engine 122 based on characteristics of the query pair utilized to generate the training instance 164A (e.g., based on magnitude of temporal separation of submissions of the queries of the query pair, comparison of search system responses for the queries of the query pair). The training instance 164A also includes training instance output that includes the variant (e.g., the later in time submitted of the pair).

The generative model training engine 120 applies the training instance input of the training instance as input to the generative model 152A. The generative model training engine 120 further generates output over the generative model 152A based on the applied input and the current learned parameter of the generative model 152A. The generative model training engine 120 further generates a gradient based on comparison of the generated output to the training instance output of the training instance 164A, and updates the generative model 152A based on the gradient (e.g., backpropagates the gradient over the entire generative model 152A).

In generating the output based on the applied input, the generative model training engine 120 can apply all or portions of the input to encoder layers 153A of the generative model 152A and generate an encoding over the encoder layers 153A. For example, tokens of the original query of the input can be applied to encoder layers 153A. The engine 120 can further apply the encoding to the decoder layers 154A of the generative model 152A and generate a decoding of the encoding over the decoder layers 154A. The engine 120 can then apply the generated encoding to softmax layers 155A and generate the output over the softmax layers 155A based on the application of the generated encoding. In some implementations, the engine 120 applies the attributes and/or type of the input to other layers and/or as a "side input" to one of encoder layers 153A, decoder layers 154A, and/or softmax layers 155A. In some of those implementations, the engine 120 applies the attributes and/or type to other layers that are downstream of the encoder layers 153A, but upstream from the decoder layers 154A.

Although FIG. 2 illustrates only a single training instance 164A, it is understood that many additional training instances will be utilized in training generative model 152A. It is noted that in some implementations, the single training instance 164A and the additional training instances are selected such that generative model 152A is trained to be specifically adapted to certain attributes. For example, the generative model 152A can be trained through selecting only training instances (or biasing toward training instances) that are generated based on past submissions of users with certain attribute(s). For instance, attributes of users explicitly included in training instance inputs of training instances can be utilized in such selection. Also, for example, the generative model 152A can be trained through selecting only training instances (or biasing toward training instances) that are associated with certain task attributes. For instance, the selection can be biased toward queries that were submitted in association with certain task(s) engaged in (or to be engaged in). It is also noted that in some implementations, the generative model 152A is trained utilizing training instances that include a plurality of different "types" in training instance input. As described herein, this enables generation of a multitask model that can generate variants of multiple disparate types and that, at run time, can be biased toward a particular type by applying a corresponding type value as input.

Figure 3:
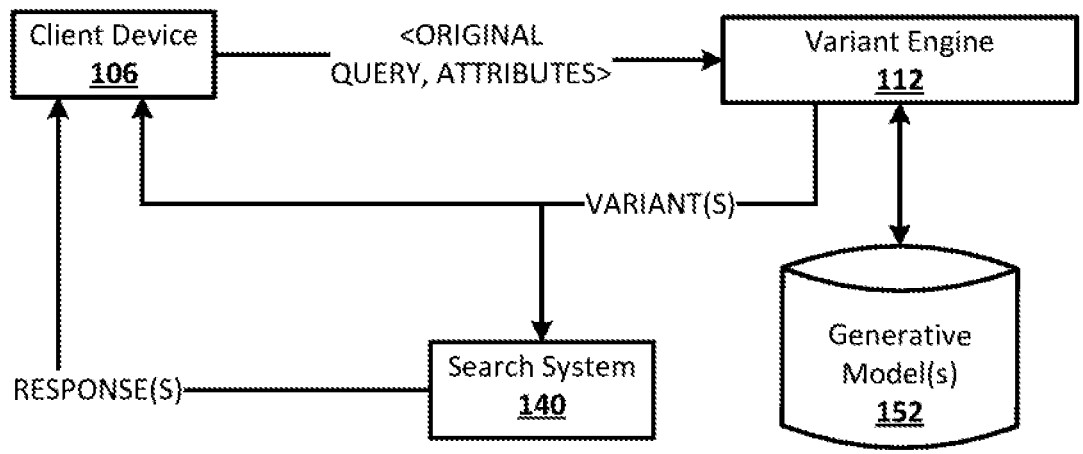
FIG. 3 illustrates an example of utilizing a generative model to generate one or more variants of a query.

FIG. 3 illustrates an example of utilizing a generative model to generate one or more variants of a query. In FIG. 3, an original query and attributes of a user are transmitted from client device 106 to variant engine 112. In some other implementations, one or more (e.g., all) of the attributes may not be transmitted by the client device 106 with the query, or may not even be transmitted by the client device 106 at all. For example, the attributes of the user may be stored remotely from the client device. For instance, the attributes can be remotely stored and based on past interactions of the user (e.g., via other client devices)—and accessed by the variant engine 112 from the remote storage.

The variant engine 112 utilizes at least one of the generative models 152 to generate one or more variants of the original query. In generating the variant(s), the variant engine 112 can utilize the attributes in selecting one of the generative models 152 and/or can apply one or more of the attributes as input to one of the generative models. The variant engine 112 can further apply tokens of the original query to the generative model and/or other features (e.g., past generated variants where multiple variants are generated in an iterative fashion).

In some implementations, the variant engine 112 transmits, to the client device 106, the variants as output to be provided based on the original query. In some implementations, the variant engine 112 additionally or alternatively provides one or more of the variants to search system 140, which determines one or more response(s) (e.g., a single answer search result, or multiple search results) for the variant(s), and transmits the response(s) to the client device as output to be provided based on the original query.

Figure 4:
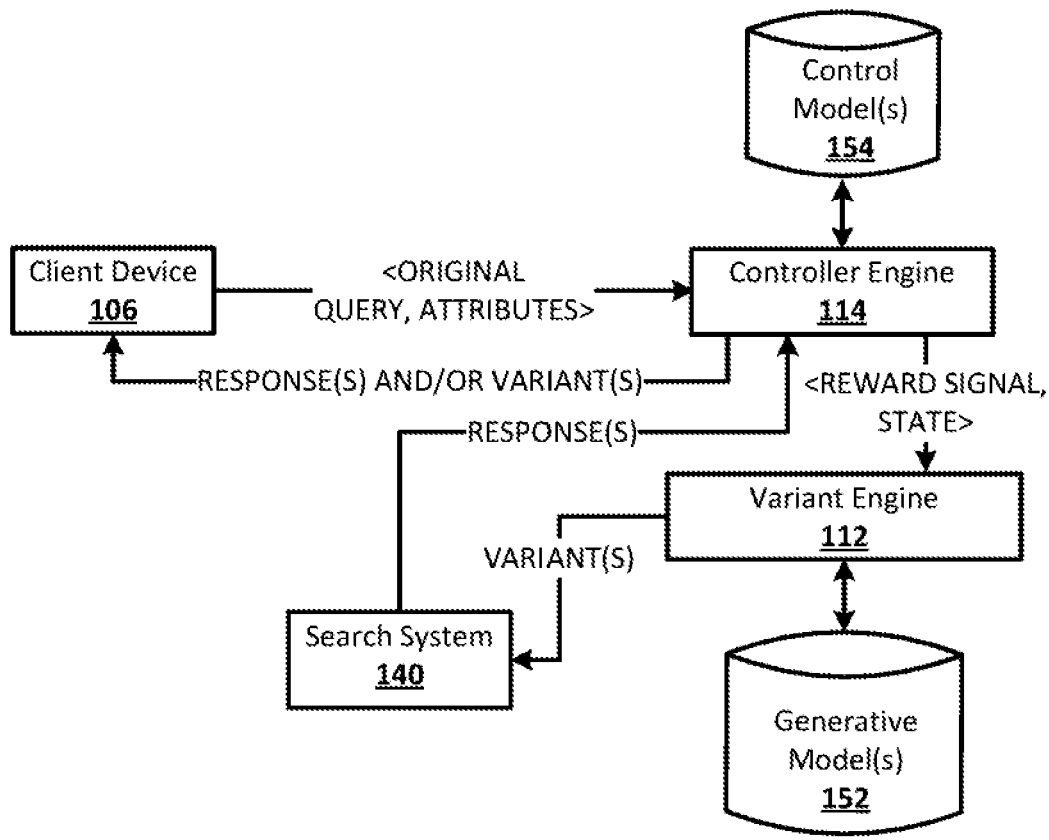
FIG. 4 illustrates another example of utilizing a generative model to generate one or more variants of a query, where a control model is utilized to control the generation of the variants.

FIG. 4 illustrates another example of utilizing a generative model to generate one or more variants of a query. In particular, FIG. 4 illustrates one example where a control model is utilized to control the generation of the variants.

In FIG. 4, an original query and attributes of a user are transmitted from client device 106 to controller engine 114. As with FIG. 3, in some other implementations, one or more (e.g., all) of the attributes may not be transmitted by the client device 106 with the query, or may not even be transmitted by the client device 106 at all.

In some implementations, the controller engine 114 utilizes one or more control models 154 to determine whether to generate a variant of the original query. For example, the controller engine 114 can apply tokens of the original query, search system response(s) to the original query and/or attributes of the user to one of the control models 154 to determine whether to generate a variant. In some other implementations, the controller engine 114 may, by default, determine that at least one variant or the original query should be generated.

The controller engine 114 provides, to the variant engine 112, a reward signal determined based on the output over the one or more control models 154, and also provides a current state. The current state can include, for example, the original query, attributes of the user, and/or a feature vector based on one or both—where the feature vector is also based on the output over the one or more control models 154.

The variant engine utilizes at least one of the generative models 152 to generate one or more variants of the original query. In generating the variant(s), the variant engine 112 can utilize the provided state and optionally the reward signal. For example, the variant engine 112 can apply the reward signal to a learned reward function to determine a reward in generating a query variant. The variant engine 112 provides the variant(s) to the search system 140. In response, the search system 140 generates one or more response(s) and provides the response(s) to the controller engine 114.

The controller engine 114 utilizes the thus far generated variant(s) and/or their corresponding response(s) to determine whether further variants should be generated by the variant engine 112. For example, the controller engine 114 can apply tokens of the thus far generated variant(s) and/or features of the corresponding response(s) as input to one of the control models 154, generate output over the control model based on the input, and utilize the output to determine whether further variants should be generated. In some implementations, the controller engine 114 further applies, as part of the input, tokens of the original query, search system response(s) to the original query, and/or attributes of the user.

If the controller engine 114 determines further variants should be generated, it can provide an updated reward signal and an updated current state (e.g., that is updated based on thus far generated variant(s) and/or corresponding variant response(s)). The variant engine 112 can then generate one or more further variants, provide the variant(s) to the search system 140, and corresponding response(s) again provided. The controller engine 114 can then again determine, based on the further variant(s) and corresponding response(s) whether further variants should be generated.

If, at a given iteration, the controller engine 114 determines further variants should not be generated, it transmits, to the client device 106, one or more search system response(s) and/or one or more generated variants as output to be provided based on the original query. For example, the controller engine 114 may store all provided response(s), and provide only one of the response(s) as responsive output (e.g., the highest quality response, or the highest quality response that was also confirmed by other responses). As another example, the controller engine 114 may provide multiple of the responses (e.g., the N best responses, a diverse set of responses).

In some implementations, control model(s) 154, generative model(s) 152, controller engine 114, and/or variant engine 112 can be trained utilizing reinforcement learning. In some of those implementations, the control model(s) 154 and/or the generative model(s) 152 may be initially trained utilizing other techniques, and refined through the reinforcement learning. For example, generative model(s) 152 may be initially trained as described with respect to FIG. 2, and further trained through reinforcement learning.

In some of those implementations, the controller engine 114 and control model(s) 154 can be viewed as the "Critic" and the variant engine 112 and generative model(s) 152 viewed as the "Actor", in an actor-critic algorithm. Generally, the Actor generates variants and probes an Environment with the variants. The Environment can be, for example, the search system 140. Generally, the Critic accumulates evidence coming from the Environment (e.g., responses such as answer strings, or ranked lists thereof), to generate global actions/decisions d, to maintain a global state s, and to provide the Actor with a reward signal r and context c.

The behavior of the Actor and Critic can be driven by reinforcement at two different time scales. The Actor can run at finer time-scale (indexed by t'). At each step the Actor generates the next variant, conditioned on the context. The Critic accumulates evidence from the Environment into a global state s. In some situations, the state will contain at least the original query, generated variants, and observations (e.g., search system responses to generated variants), as well as a vector summary h used to feed the network, $s=(\{q_t, o_t\}_{1...T}, h_t)$. Given the global state, the Critic makes a global decision d at each time step—either to emit a response, or continue the cycle of variant generation and accumulation of more evidence. The Critic also feeds the Actor with a context, to condition variant-generation, and a reward signal. The Critic directly models the value of a state-action pair "Q-function" $Q(s_t, d_t)$. This value of the Q-function is passed as the reward signal to the Actor. The Q-function is trained using the global reward, defined on the response(s) (e.g., response(s) to the original query) and the sequence of decisions d made. The separation of time-scales allows the two tasks, variant generation and global decision making, to be modelled separately, but trained jointly to optimize the end-to-end performance.

A terminal state is reached when the Critic emits a response instead of continuing the cycle of variant generation and accumulation of more evidence. An action space for the Actor can be defined as: $A:=\{(\alpha, <w>): \alpha \in \{\text{question}, \text{answer}\}, <w> \in \text{Strings}\}$, where $\alpha$ can be either probe the Environment with a variant, or emit a response. The action is paired with a string, $<w>$, that defines the variant or answer (emitted response). In some implementations, the "probe the environment with the variant" actions receive no reward and the "emit a response actions" receive a reward proportional to the quality of the answer. The Critic can learn a Q function that maps actions (a, $<w>$) from the current state, to the expected return E[Gs]. Where only the "emit a response actions" are rewarded, the expected return can be expressed as $E[\gamma^k R]$, where [0, 1] is the discount, k is the number of iterations to the final state, and R is the final reward.

Q function training can be achieved utilizing a Monte-Carlo Q-learning approach. Variants can be sampled until the final state is reached, a reward determined, and all the intermediate predictions of the Q function can be updated toward $\gamma^k$. The Actor generates variants and can include, for example, a Sequence to Sequence model that takes, as input, the original query, the latest variant, and possibly more features conditioning on the history of variants and responses—and returns one or more further variants. The Actor can be trained with a Monte-Carlo Policy Gradient approach. The response set received form the Environment serves as the memory of the answers seen so far. It can be used to provide features to the Actor and Q function, and/or to allow the Critic to return answers seen at any intermediate iteration.

Figure 5:
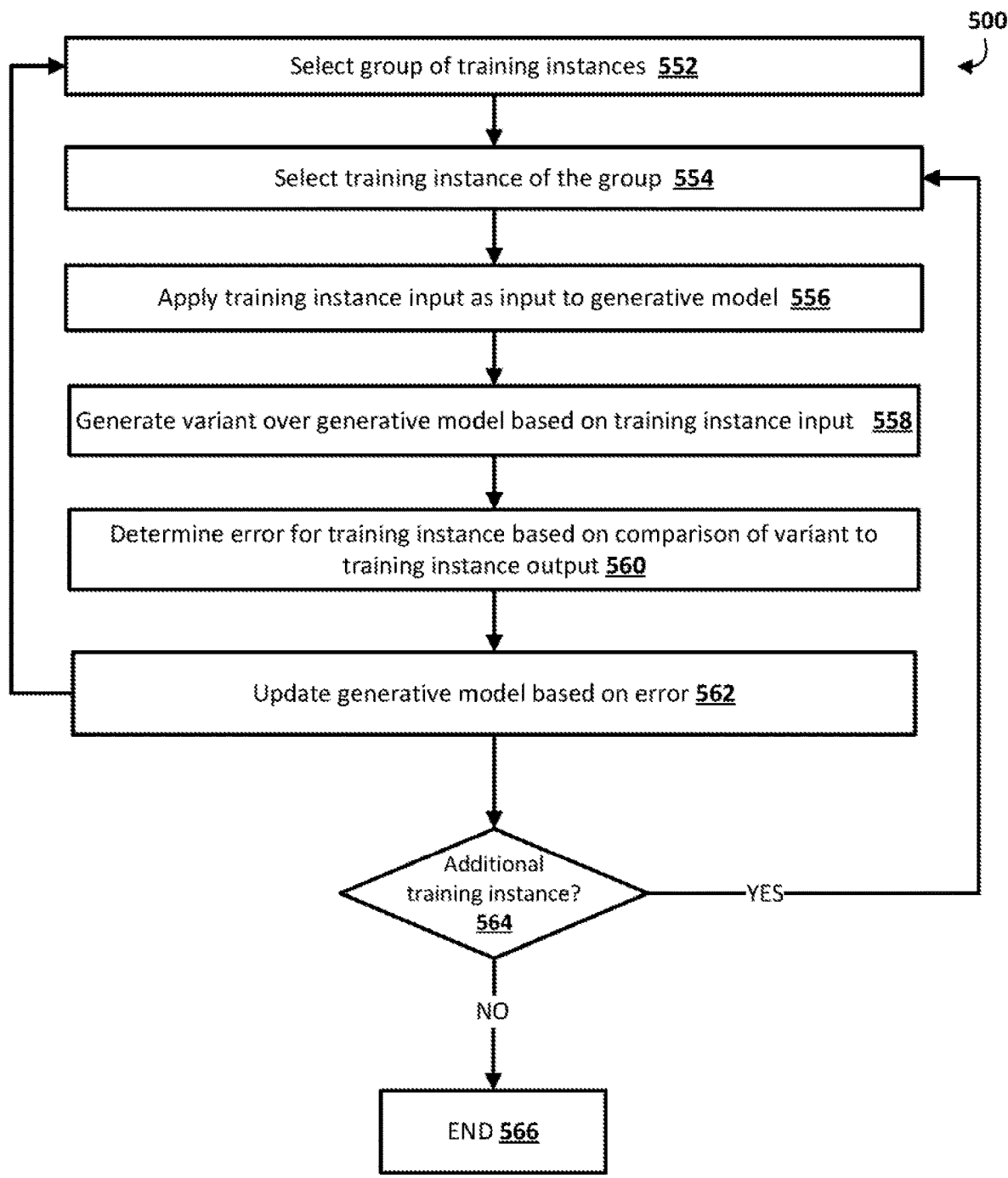
FIG. 5 is a flowchart illustrating a method of training a generative model according to implementations disclosed herein.

Turning now to FIG. 5, a flowchart is provided that illustrates a method 500 of training a generative model according to various implementations disclosed herein. For convenience, the operations of the flow chart are described with reference to a system that performs the operations. This system may include one or more components, such as one or more processors (e.g., CPU(s), GPU(s), and/or TPU(s)). While operations of method 500 are shown in a particular order, this is not meant to be limiting. One or more operations may be reordered, omitted or added.

At block 552, the system selects a group of training instances. For example, when the generative model is trained in method 500 to be a multitask model, the system may select the group such that the group includes training instances demonstrating multiple types of variant generation. Also, for example, if the generative model is additionally or alternatively being trained to be particularized to particular group(s) of users, the system may select the group such that the training instances only include, or include a significant quantity (e.g., greater than half, greater than 70%) of, training instances that are based on past submissions of queries by users that conform to the particular group(s). Also, for example, if the generative model is additionally or alternatively being trained to be particularized to particular task(s), the system may select the group such that the training instances only include, or include a significant quantity (e.g., greater than half, greater than 70%) of, training instances that are based on past submissions of queries in association with the particular task(s).

At block 554, the system selects a training instance of the group.

At block 556, the system applies training instance input, of the training instance, as input to a generative model. The training instance input can include, for example, terms of an original query, attributes (e.g., of the user that submitted the original query), and a type value (that indicates a type of the variant of the original query).

At block 558, the system generates a variant over the generative model based on the applied training instance input.

At block 560, the system determines an error for the training instance based on comparison of the generated variant to the training instance output (i.e., to a variant indicated in the training instance output).

At block 562, the system updates the generative model based on the error. For example, the error may be a gradient that is backpropagated over the generative model to update the generative model.

At block 564, the system determines whether there are any additional unprocessed training instances in the group. If so, the system proceeds to block 554 and selects an additional training instance. The system then performs blocks 556, 558, 560, and 562 based on the additional training instance.

If, at an iteration of block 564, the system determines there are not any additional unprocessed training instances in the group (or that other training criteria has been satisfied), the system proceeds to block 566, where the training ends.

Although FIG. 5 illustrates a particular non-batch training approach, it is understood that batch training (e.g., where error is determined and backpropagated based on a batch of training instances) may additionally or alternatively be utilized in training. Also, it is understood that in various implementations, a generative model trained based on method 500 may be further trained according to techniques disclosed herein. For example, the generative model may be further trained utilizing reinforcement learning techniques, and may be further trained separate from, but in combination with, a separate control model. Moreover, where multiple generative models are generated, method 500 may be repeated, with different selection criteria in block 552, to generate further model(s).

Figure 6:
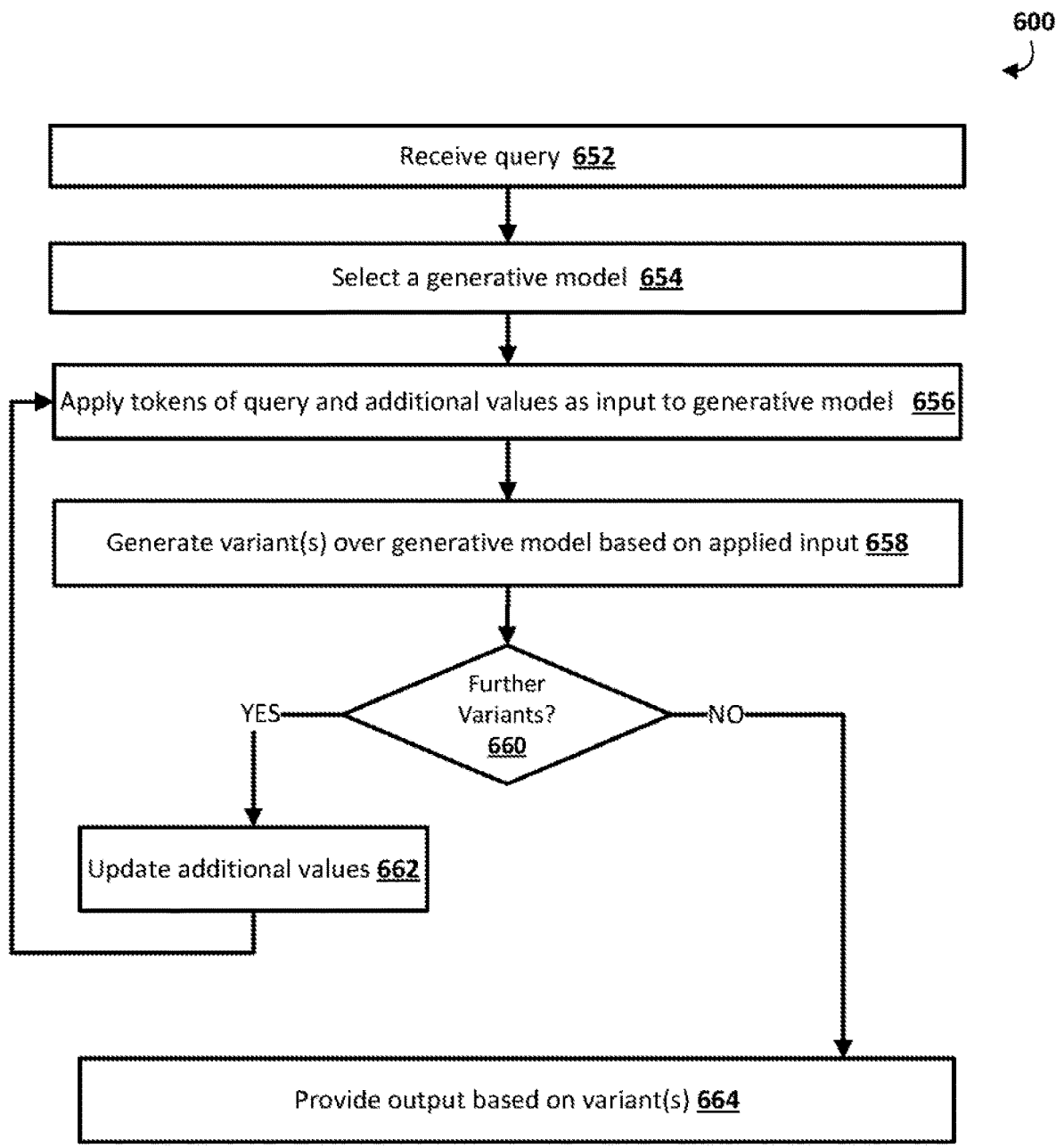
FIG. 6 is a flowchart illustrating a method of utilizing a generative model to generate one or more variants of a query.

Turning now to FIG. 6, a flowchart is provided that illustrates a method 600 of utilizing a generative model to generate one or more variants of a query according to various implementations disclosed herein. For convenience, the operations of the flow chart are described with reference to a system that performs the operations. This system may include one or more components, such as one or more processors (e.g., CPU(s), GPU(s), and/or TPU(s)). While operations of method 600 are shown in a particular order, this is not meant to be limiting. One or more operations may be reordered, omitted or added.

At block 652, the system receives a query.

At block 654, the system selects a generative model from a plurality of candidate generative models. In some implementations, the system selects the generative model based on one or more attributes of a user that submitted the query of block 652. For example, the system can select the generative model based on it being stored in association with attributes that match the one or more attributes of the user. For instance, it can be stored in association with such attributes based on being trained based on training instances that are based on past query submissions of users having those attributes. In some implementations, block 654 may be omitted (e.g., only a single generative model may be available).

At block 656, the system applies tokens of the query and additional values as input to the generative model. Various additional values can be applied, such as attributes of a user that submitted the query, temporal attributes, and/or attributes for search system response(s) for the received query. As one particular example, the additional values can include a predicted task attribute of the user that submitted the query. The predicted task attribute can be predicted based on, for example, content recently viewed on a computing device by the user, a stored calendar entry of the user, and/or electronic communication(s) of the user.

At block 658, the system generates one or more variants over the generative model based on the applied input.

At block 660, the system determines whether to generate further variants. In some implementations, the system determines whether to generate further variants based on properties of the so-far generated variants and/or based on response(s) from a search system for the so-far generated variants. For example, the system can determine whether to generate further variants based on whether response(s) to the so-far generated variant(s) were found by the search system and/or quality measure(s) of the response(s). For instance, the system can generate further variants if no responses were found and/or if quality measure(s) fail to satisfy one or more quality criteria.

If, at an iteration of block 660, the system determines to generate further variants, the system proceeds to block 662 and updates one or more additional values that are to be applied as input to the generative model in a subsequent iteration of block 656. For example, the system can update the additional values to reflect variant(s) generated in a most recent iteration of block 658, to reflect response(s) to the variant(s), and/or to change a type value for a next iteration of block 658. The system then performs another iteration of block 656 using the updated additional values, then proceeds to blocks 658 and 660.

If, at an iteration of block 660, the system determines not to generate further variants, the system proceeds to block 664 and provides output that is based on one or more of the generated variants. The output can include one or more of the variant(s) and/or search system response(s) to one or more of the variant(s).

Figure 7:
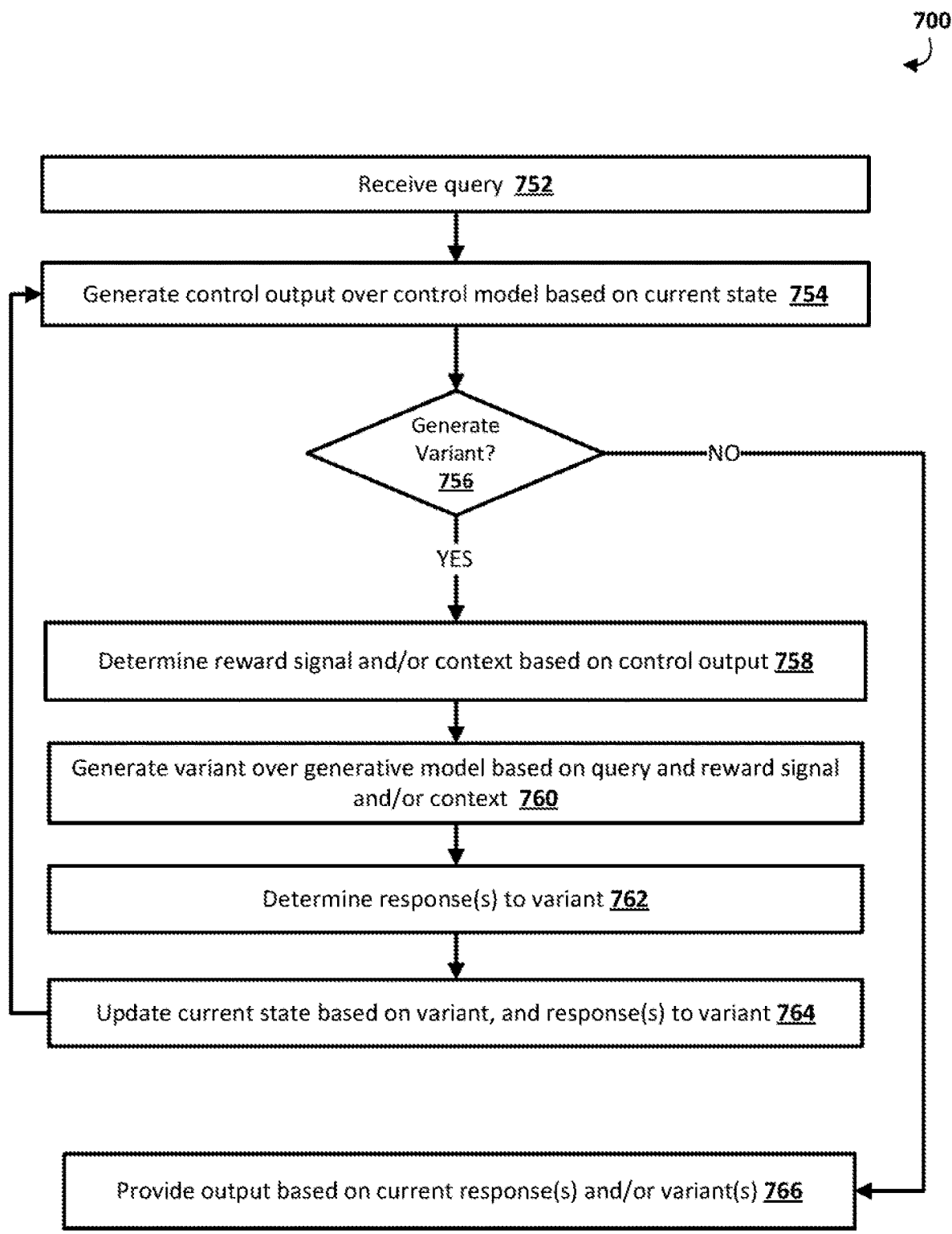
FIG. 7 is a flowchart illustrating a method of utilizing a generative model to generate one or more variants of a query, where a control model is utilized to control the generation of the variants.

FIG. 7 is a flowchart illustrating a method 700 of utilizing a generative model to generate one or more variants of a query, where a control model is utilized to control the generation of the variants. For convenience, the operations of the flow chart are described with reference to a system that performs the operations. This system may include one or more components, such as one or more processors (e.g., CPU(s), GPU(s), and/or TPU(s)). While operations of method 700 are shown in a particular order, this is not meant to be limiting. One or more operations may be reordered, omitted or added.

At block 752, the system receives a query.

At block 754, the system generates control output over a control model based on a current state. For example, the current state can be based on tokens of the current query, search system responses to the current query, and/or other features.

At block 756, the system determines, based on the control output, whether to generate a variant of the received query. In some implementations, block 754 and an initial iteration of block 756 may be omitted. In other words, in those implementations the system may determine to always generate a variant (e.g., in order to check the validity of a search system response to the received query).

If, at an iteration of block 756, the system determines to not generate a variant, the system proceeds to block 766 and provides output that is based on current search system response(s) and/or generated variant(s).

If, at an iteration of block 756, the system determines to generate a variant, the system proceeds to block 758.

At block 758, the system determines a reward signal and/or a context based on the control output generated at a most recent iteration of block 754. The reward signal can be based on a learned Q-function as described herein and the context can include, for example, the current state and/or a vector summary of the current state.

At block 760, the system generates a variant over a generative model based on the received query and the reward signal and/or context of block 758.

At block 762, the system determines response(s) to the variant generated at block 760. For example, the system can submit the variant to a search system and receive response(s) from the search system that are responsive to the variant. In some situations, the search system doesn't return a response and/or generates a "null", each of which indicates no response (e.g., answer) is available.

At block 764, the system updates the current state based on the variant, and the response(s) to the variant. The system then proceeds back to block 754 and generates control output over the control model based on the current state that includes the updates of block 764. In this manner, in subsequent iterations of block 764, previously generated variant(s) and response(s) (i.e., generated in previous iterations of blocks 760 and 762) can be considered at the next iteration of block 754. The system then proceeds back to block 756 and determines, based on the control output, whether to generate another variant of the received query. When the system determines to generate another variant, it is noted that the reward signal and context provided at a next iteration of block 758 can likewise be conditioned on the previously generated variant(s) and response(s) (i.e., generated in previous iterations of blocks 760 and 762). In this manner, the variant generation of a next iteration of block 760 is resultantly influenced by the previously generated variant(s) and response(s).

Figure 8A:
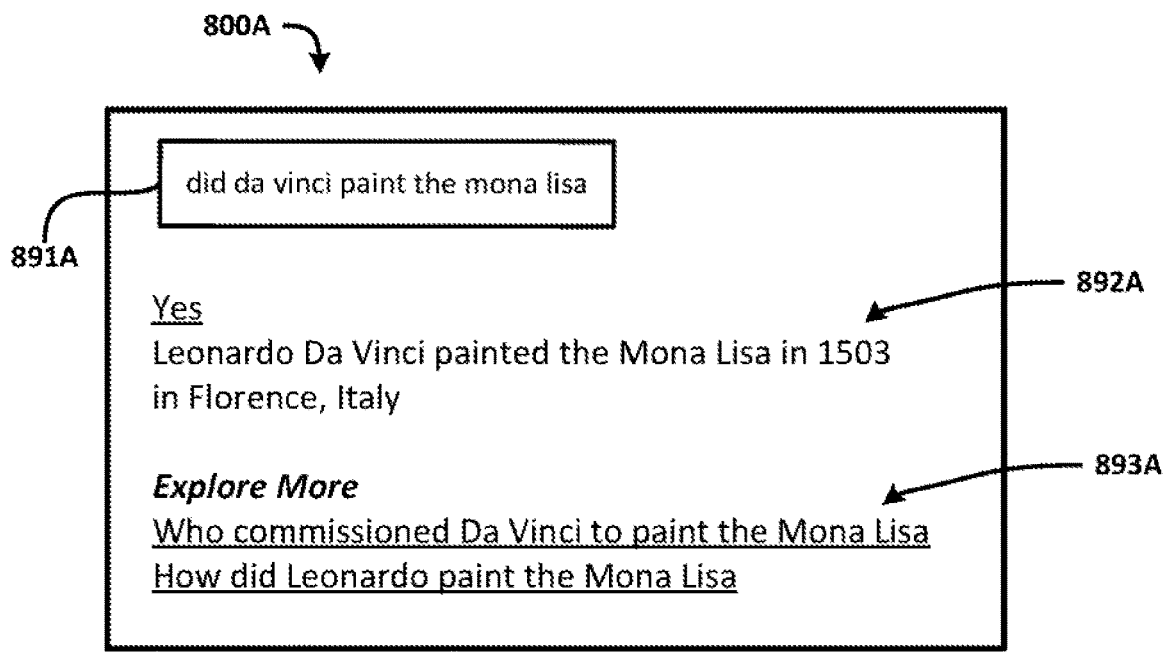
FIG. 8A and FIG. 8B each illustrate an example graphical user interface for providing output that is based on variant(s) generated according to implementations disclosed herein.
Figure 8B:
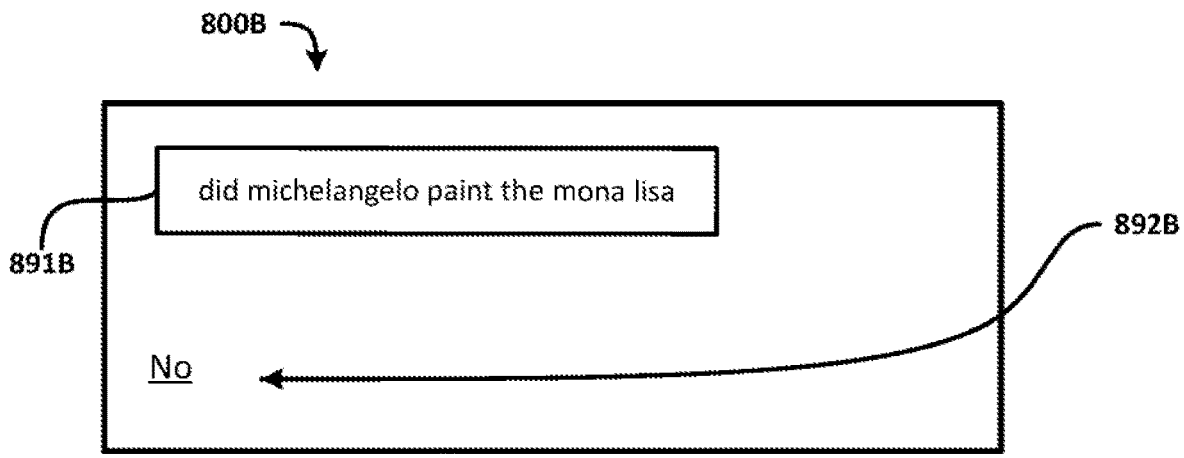
Figure 8B:
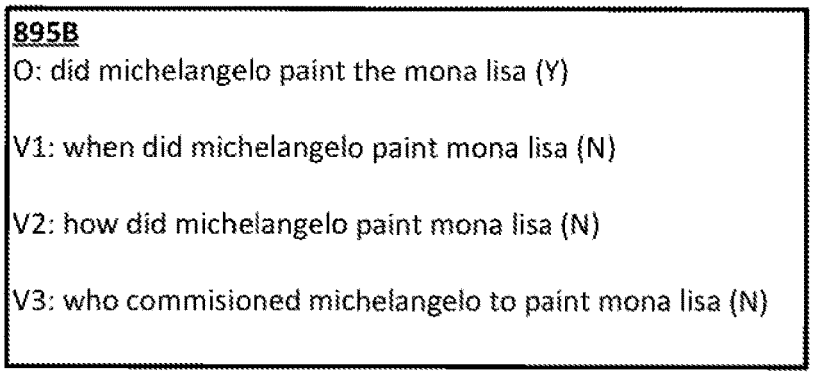

Turning now to FIG. 8A and FIG. 8B, example graphical user interfaces 800A and 800B are illustrated for providing output that is based variant(s) generated according to implementations disclosed herein. The graphical user interfaces 800A and 800B may be presented at client device 106 (e.g., in a browser executing at client device 106 and/or in another application executing at client device 106).

In FIG. 8A, a user has provided a query 891A of "did da vinci paint the mona lisa". In response, output is provided that includes a response 892A and that also includes two variants 893A. The two variants 893A can be generated according to implementations disclosed herein. In some implementations, each of the variants is selectable and, in response to a selection, causes the corresponding variant to be submitted as a new query. In some implementations, the response 892A is also based on variant(s) generated according to implementations disclosed herein. For example, in some situations the response 892A may be the response for a variant of the query 891A (a variant that differs from variants 893A) and/or the response 892A may be for the query 891A, but verified based on response(s) to variant(s) of the query (e.g., by ensuring those variant's also generated affirmative responses).

In FIG. 8B, a user has provided a query 891B of "did michelangelo paint the mona lisa". In response, output is provided that includes a response 892B of "no". Box 895B of FIG. 8B may optionally not be provided for display, but is presented as an example of variants that may be generated, according to techniques described herein, in order to generate the response 892B of "no". Box 895B displays the original query (indicated by "O") and includes a "Y" in parentheses to indicate that an answer response was generated by a search system in response to the original query. For example, the answer response could be that "yes, Michelangelo did paint the Mona Lisa". However, instead of providing the answer response, multiple variants that are "follow-up" variants are generated in order to verify the accuracy of the response to the original query. In particular variants V1, V2, and V3 are generated. As indicated by the "N" in parentheses, "no answer" responses were generated by the search system in response to each of those follow-up variants. In view of no answer being available for those multiple follow-ups, a controller engine may determine that the "answer response" to the original query is incorrect (since follow-ups do not lead to any answers). As a result, the controller engine may provide the response 892B of "No".

Although examples of graphical interfaces are presented in FIGS. 8A and 8B, it is understood that queries may additionally or alternatively be received based on spoken input of a user and/or that variants and/or responses may additionally or alternatively be provided for presentation to a user audibly via a client device.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 9:
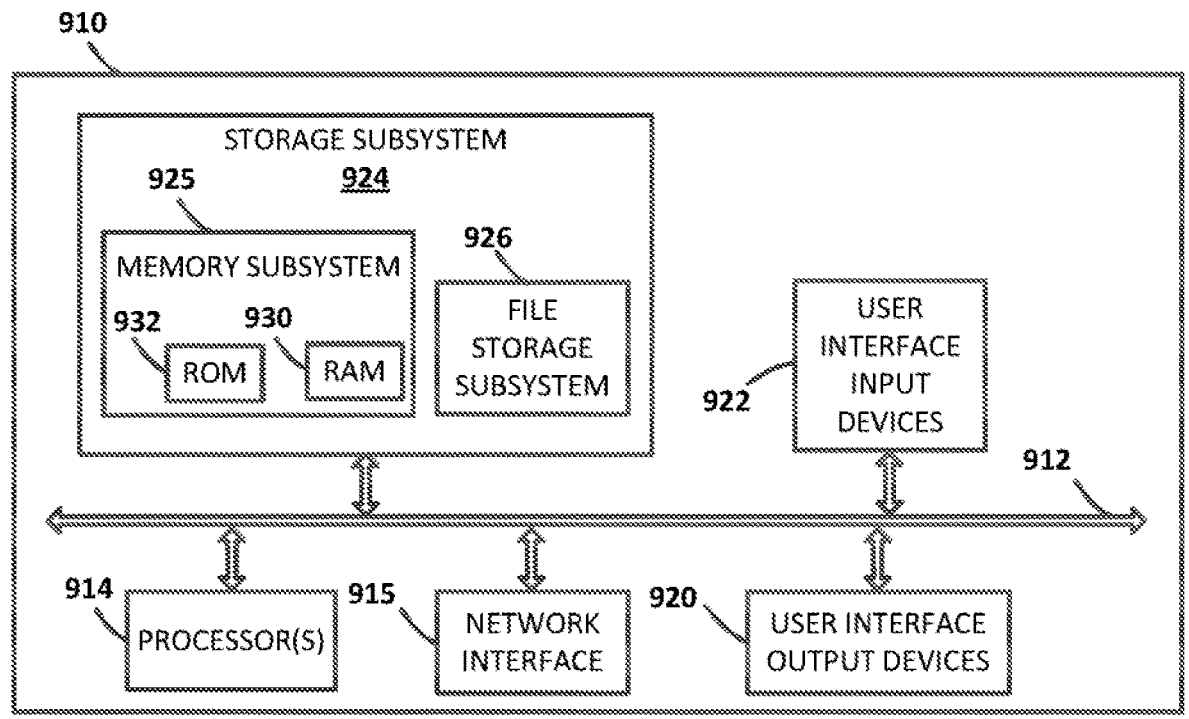
FIG. 9 illustrates an example architecture of a computing device.

FIG. 9 is a block diagram of an example computing device 910 that may optionally be utilized to perform one or more aspects of techniques described herein. Computing device 910 includes at least one processor 914 (e.g., a CPU, GPU, and/or TPU) which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 915. The input and output devices allow user interaction with computing device 910. Network interface subsystem 915 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a regular image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the methods described herein.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a solid state drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

What is claimed is:

1. A method implemented by one or more processors, comprising:
   receiving an original query, the original query generated based on user interface input of a user via a client device;
   applying tokens of the original query as input to a trained generative model;
   generating at least one variant of the original query based on application of tokens of the original query to the trained generative model;
   generating an output based on at least one of: the at least one variant, and at least one search system response, from a search system, to the at least one variant;
   providing, in response to the original query, the output for presentation via the client device; and
   prior to generating the at least one variant:
      determining, utilizing one or more trained control models, whether any variants are to be generated for the original query, wherein the determining whether any variants are to be generated for the original query comprises:
         applying, to the one or more trained control models, one or more features of at least one response, from the search system, to the original query;
         generating controller output over the one or more trained control models that indicates whether variants are to be generated; and
         determining to generate the at least one variant based on the controller output.

2. The method of claim 1, further comprising:
   applying, as part of the input to the trained generative model, one or more attributes associated with the user.

3. The method of claim 2, further comprising:
   generating at least one variant of the original query based on the one or more attributes to the trained generative model.

4. The method of claim 2, wherein the one or more attributes include one or more of: a location of the user, a task currently engaged in by the user, and weather at the location of the user.

5. The method of claim 1, further comprising:
   applying, as part of the input to the trained generative model, one or more temporal attributes, including at least one of: a current time, a current day of the week, and a current date.

6. The method of claim 1, further comprising:
   determining a predicted task for the user;
   applying, as input to the trained generative model:
      one or more task attributes of the predicted task for the user;

and wherein generating at least one variant of the original query is based on application of the one or more task attributes to the trained generative model.

7. The method of claim 6, wherein determining the predicted task of the user is based on one or more interactions with the user via the client device or an additional client device.

8. The method of claim 7, wherein the one or more interactions, based on which the predicted task is determined, include an electronic communication sent by the user or a calendar entry created by the user.

9. The method of claim 6, wherein determining the predicted task of the user is based on an electronic communication sent to the user or a stored calendar entry of the user.

10. The method of claim 6, further comprising:
generating a training instance that includes training instance input and training instance output,
the training instance input including:
first query tokens of a first query, and
a task attribute,
the training instance output including:
second query tokens of a second query;
wherein the training instance is generated with the task attribute as training instance input based on determining that a past submission of the first query, followed by a past submission of the second query, is associated with the predicted task; and
training the generative model based on the generated training instance.

11. The method of claim 6, further comprising:
selecting a trained generative model, from a plurality of trained generative models, based on the trained generative model being trained based on past query submissions associated with the predicted task.

12. The method of claim 11, further comprising:
selecting training instances that are generated based on the past query submissions associated with the predicted task; and
training the generative model based on the selected training instances.

13. The method of claim 12, further comprising:
determining that a group of two or more previously submitted queries are associated with the predicted task;
generating one of the training instances based on the previously submitted queries of the group; and
labeling the one of the training instances as associated with the predicted task;
wherein selecting the training instances that are generated based on the previously submitted queries associated with the predicted task comprises selecting the one of the training instances based on the labeling.

14. The method of claim 13, wherein determining that the group of two or more previously submitted queries are associated with the predicted task is based on a computing based action performed following submission of the previously submitted queries.

15. The method of claim 1, further comprising:
selecting a trained generative model, from a plurality of trained generative models, based on the trained generative model being trained based on past query submissions of a group of users having one or more attributes in common with the user, and
applying tokens of the original query as input to the selected trained generative model.

16. The method of claim 1, wherein the trained generative model is a deep neural network model with one or more memory layers.

17. The method of claim 1, wherein
generating the variant of the query comprises producing the variant based on learned parameters of the trained generative model,
the method further comprising applying additional input to the trained generative model, the additional input comprising at least one of: tokens of the original query, and variant tokens of the variant of the original query;
generating an additional variant of the original query over the trained generative model based on the additional input, wherein the additional variant varies from the variant and the original query, and wherein generating the additional variant of the original query comprises producing the additional variant based on the learned parameters of the trained generative model;
determining an additional variant response for the additional variant of the original query based on submission of the additional variant of the original query to the search system;
generating an output based on at least one of: the variant response, and the additional variant response; and
providing, in response to the original query, the output for presentation via the client device.

18. The method of claim 17, wherein the trained generative model is trained to generate multiple types of query variants, and wherein the variant is a first type of the multiple types of query variants and the additional variant is a second type of the multiple types of query variants.

19. The method of claim 18, wherein the first type is one of: an equivalent query, a follow-up query, a generalization query, a canonicalization query, an entailment query, a specification query, a clarification query, and a language translation query; and wherein the second type is another one of: the equivalent query, the follow-up query, the generalization query, the canonicalization query, the entailment query, the specification query, the clarification query, and the language translation query.

20. The method of claim 18, wherein the variant is generated over the trained generative model as the first type based on a first type value being applied as part of the input to the trained generative model, and wherein the additional variant is generated over the trained generative model as the second type based on a second type value being applied as part of the additional input to the trained generative model.

21. The method of claim 1, wherein the one or more trained control models are trained using reinforcement learning.

22. A method implemented by one or more processors, comprising:
receiving an original query, the original query generated based on user interface input of a user via a client device;
applying tokens of the original query as input to a trained generative model;
generating a first variant of the original query based on application of tokens of the original query to the trained generative model;
generating an output based on at least one of: the first variant, and at least one search system response from a search system, to the first variant; and
providing, in response to the original query, the output for presentation via the client device;

subsequent to generating the first variant:
  determining, utilizing one or more trained control models, whether one or more additional variants are to be generated for the original query, wherein the determining whether one or more additional variants are to be generated for the original query comprises:
    applying one or more features of the at least one search system response, to the first variant, to one or more trained control models;
    generating controller output over the one or more trained control models that indicates whether one or more additional variants are to be generated; and
    determining, based on the controller output, to generate one or more additional variants; and
  in response to determining to generate the one or more additional variants:
    generating a second variant of the original query;
    generating an additional output based on at least one of: the second variant, and at least one additional search system response from the search system, to the second variant; and
    providing, in response to the original query, the additional output for presentation via the client device.

23. A system comprising:
a processor;
a memory in communication with the processor, wherein the memory stores instructions that, in response to execution of the instructions by the processor, cause the processor to:
  receive an original query, the original query generated based on user interface input of a user via a client device;
  apply tokens of the original query as input to a trained generative model;
  generate at least one variant of the original query based on application of tokens of the original query to the trained generative model;
  generate an output based on at least one of: the at least one variant, and at least one search system response, from a search system, to the at least one variant;
  provide, in response to the original query, the output for presentation via the client device; and
  prior to generating the at least one variant:
    determine, utilizing one or more trained control models, whether any variants are to be generated for the original query, wherein in determining whether any variants are to be generated for the original query, the processor is to:
      apply, to the one or more trained control models, one or more features of at least one response, from the search system, to the original query;
      generate controller output over the one or more trained control models that indicates whether variants are to be generated; and
      determine to generate the at least one variant based on the controller output.

* * * * *